United States Patent
Hwang et al.

(10) Patent No.: US 9,880,966 B1
(45) Date of Patent: Jan. 30, 2018

(54) ENCAPSULATING METADATA OF A PLATFORM FOR APPLICATION-SPECIFIC TAILORING AND REUSE OF THE PLATFORM IN AN INTEGRATED CIRCUIT

(71) Applicant: Xilinx, Inc., San Jose, CA (US)

(72) Inventors: L. James Hwang, Portola Valley, CA (US); Vinod K. Kathail, Palo Alto, CA (US); Sundararajarao Mohan, Sunnyvale, CA (US); Jorge E. Carrillo, San Jose, CA (US); Hua Sun, San Jose, CA (US)

(73) Assignee: XILINX, INC., San Jose, CA (US)

( * ) Notice: Subject to any disclaimer, the term of this patent is extended or adjusted under 35 U.S.C. 154(b) by 154 days.

(21) Appl. No.: 14/845,127

(22) Filed: Sep. 3, 2015

(51) Int. Cl.
*G06F 13/24* (2006.01)
*G06F 13/40* (2006.01)
*G06F 13/42* (2006.01)
*G06F 3/00* (2006.01)

(52) U.S. Cl.
CPC .......... *G06F 13/4256* (2013.01); *G06F 13/24* (2013.01); *G06F 13/4022* (2013.01)

(58) Field of Classification Search
CPC ... G06F 3/00; G06F 5/00; G06F 12/00; G06F 13/00
See application file for complete search history.

(56) References Cited

U.S. PATENT DOCUMENTS

| | | | |
|---|---|---|---|
| 8,762,916 B1 | 6/2014 | Kathail et al. | |
| 8,775,986 B1 | 7/2014 | Mohan et al. | |
| 9,075,624 B2 | 7/2015 | Carrillo | |
| 2002/0108006 A1* | 8/2002 | Snyder | G06F 1/08 710/100 |
| 2006/0236018 A1* | 10/2006 | Dao | G06F 15/7867 710/317 |

OTHER PUBLICATIONS

"SDSoC User Guide: Platforms and Libraries," Xilinlx, Inc., User Guide, UG1146, Feb. 4, 2015, 36 pg., San Jose, CA USA.
U.S. Appl. No. 14/540,854, Carrillo, Jorge E., et al., filed Nov. 13, 2014, San Jose, CA USA.
U.S. Appl. No. 14/535,258, Kathail, Vinod K., et al., filed Nov. 6, 2014, San Jose, CA USA.

\* cited by examiner

*Primary Examiner* — Scott Sun
(74) *Attorney, Agent, or Firm* — Kevin T. Cuenot

(57) ABSTRACT

Application-specific tailoring and reuse of a platform for a target integrated circuit may include determining, using a processor, a plurality of unused interfaces of the platform and determining, using the processor, connectivity of a circuit block to be coupled to the platform within the target integrated circuit. The method may include coupling, using the processor, the circuit block to the platform using an interface that is compatible with the circuit block and selected from the plurality of unused interfaces of the platform.

20 Claims, 4 Drawing Sheets

US 9,880,966 B1

ENCAPSULATING METADATA OF A PLATFORM FOR APPLICATION-SPECIFIC TAILORING AND REUSE OF THE PLATFORM IN AN INTEGRATED CIRCUIT

FIELD OF THE INVENTION

This disclosure relates to integrated circuits (ICs) and, more particularly, to re-use and enhancement of a platform in a target IC.

BACKGROUND

A system-on-chip (SOC) is a type of semiconductor, integrated circuit (IC) device that includes a processor. The processor is configured to execute program code. The SOC further includes one or more other circuits that operate cooperatively with one another and/or with the processor. In some cases, the other circuits are hardwired. In other cases, the other circuits may be implemented using programmable circuitry of the SOC.

A design that runs on an SOC includes a complex combination of hardware and software source files. The software source files, when compiled, may be executed by the processor of the SOC. The hardware source files may be synthesized into circuitry.

When an existing design is to be changed, updated, or extended in some way, the modifications are typically undertaken in an ad hoc manner that may not be generalized to other designs. The modification process is often time consuming and complex to implement despite the availability of advanced electronic design automation tools.

SUMMARY

A computer-implemented method may include determining, using the computer, a plurality of unused interfaces of a platform for a target integrated circuit (IC) and determining, using the computer, connectivity of a circuit block to be coupled to the platform within the target IC. The method may also include coupling, using the computer, the circuit block to the platform using an interface that is compatible with the circuit block and selected from the plurality of unused interfaces of the platform.

A system may include a processor programmed to initiate executable operations. The executable operations may include determining a plurality of unused interfaces of a platform for a target IC and determining connectivity of a circuit block to be coupled to the platform within the target IC. The executable operations also may include coupling the circuit block to the platform using an interface that is compatible with the circuit block and selected from the plurality of unused interfaces of the platform.

A method of processing a circuit design for a platform of a target integrated circuit may include determining, using a computer, available interfaces of hardware modules of the circuit design of the platform, determining, using the computer, a plurality of software components of the circuit design for the platform, and generating, using the computer, metadata specifying the available interfaces and the plurality of software components of the platform. The metadata may be stored in a data structure in a computer-readable storage medium by the computer.

A non-transitory computer-readable storage medium may include instructions stored thereon which, when executed by a processor, perform the methods described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
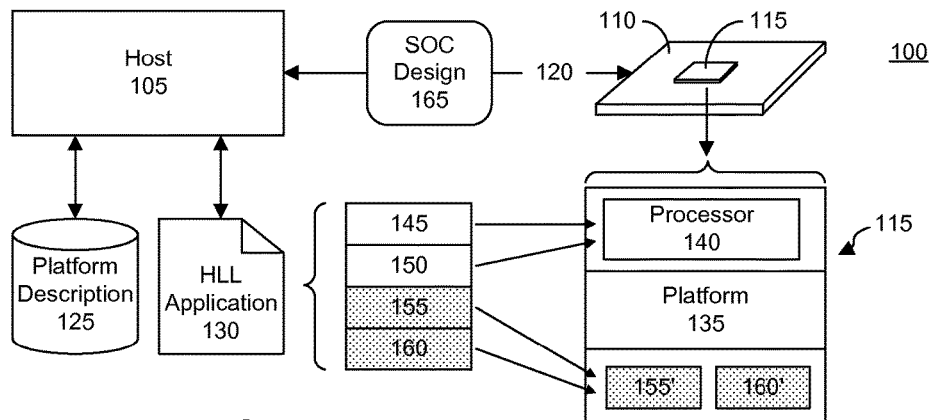
FIG. 1 is a block diagram illustrating an exemplary design environment for implementing a customized system-on-chip (SOC) design.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to re-use and enhancement of a platform in a target IC. In accordance with the inventive arrangements described within this disclosure, metadata describing a circuit design may be generated. The circuit design may be referred to as a "platform." The metadata may specify hardware and software resources of the target IC that are used by the platform and/or hardware and software resources that are not used by the platform and, as such, are considered available for use. Unused hardware and/or software resources of the target IC may be used to implement additional hardware and software that may operate in cooperation with the platform within the target IC.

The metadata that is captured for the platform provides sufficient detail for a system to facilitate reuse and extension of the existing platform. In one aspect, the system may reuse and/or extend the existing platform solely by accessing the metadata. For example, the system need not access the actual design, e.g., source, files for the platform in order to determine how to layer or couple additional hardware and/or software onto the existing hardware and/or software of the platform.

In illustration, a system may query the metadata for the platform. The system may query the platform using an application programming interface (API). By querying the metadata, the system may determine which resources of the target IC are available and which are not. Further, the system may determine the particular properties of the various resources of the platform and the context in which the resources are being used. The system may then utilize available resources of the target IC to implement further hardware and/or software for the platform. The metadata provides sufficient information for the system to effectively extend the functionality of the existing platform.

The inventive arrangements described herein may be implemented as a method or process performed by a data processing system. In another aspect, the inventive arrangements may be implemented as a data processing system having a processor. The processor, upon executing program code, may perform the operations described within this disclosure. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary development environment 100 for implementing a customized SOC. As pictured, development environment 100 may include a host 105 coupled to a circuit board 110. A target IC 115 may be coupled to circuit board 110. Target IC 115 may be a programmable IC. Further, target IC 115 may be an SOC. Host 105 may be coupled to circuit board 110 through a communication link 120.

Host 105 may be implemented as a data processing system executing a suitable integrated development environment (IDE) or other electronic design automation (EDA) application. Circuit board 110 may be implemented as a printed circuit board or card with circuitry thereon coupling communication link 120 with IC 115. Communication link 120 may be implemented as any of a variety of different wired and/or wireless connections.

In operation, host 105 may receive a platform description 125 and a high level programming language (HLL) application 130. Platform description 125 may store a variety of hardware and software components and/or descriptions thereof describing a platform 135 that may be implemented in target IC 115. Platform description 125 may be stored in a data structure in a computer-readable storage medium. For example, platform description 125 may be implemented as one or more text files, a database, one or more markup language files, or the like. HLL application 130 may be specified as source code in a high level programming language such as C, C++, or the like. In one aspect, HLL application 130 may be formatted so that HLL application 130 may be compiled into object code and executed in a processor 140 of target IC 115 if compiled to do so.

As pictured, HLL application 130 may include a plurality of functions 145, 150, 155, and 160. For purposes of illustration, the shaded functions of HLL application 130 are marked for hardware acceleration. As such, functions 155 and 160 will be implemented in hardware within target IC 115 as opposed to being executed by processor 140 of IC 115. Functions 145 and 150 may be executed by processor 140.

In one aspect, host 105 may query platform description 125 and determine various attributes of platform 135. Platform description 125 may be implemented within host 105 and/or within another data processing system coupled to host 105. Host 105 may process HLL application 130 to operate in cooperation with platform 135. For example, platform 135 may specify one or more circuits that may be implemented within programmable circuitry of target IC 115 and/or one or more software components that may execute in processor 140. Host 105 may generate hardware accelerators 155' and 160' for functions 155 and 160. Hardware accelerators 155' and 160' may be functionally equivalent circuit implementations of functions 155 and 160, respectively. As defined within this specification, the term "hardware accelerator" refers to a user specified design that is to be used with a platform. The hardware accelerator may be initially specified using an HLL or as a hardware module, and is implemented in programmable circuitry of target IC 115.

Host 105 may provide the resulting SOC design 165 to target IC 115 for implementation therein. In one arrangement, SOC design 165 may be specified as one or more executable files, e.g., binaries, and a configuration bitstream specifying circuitry to be implemented within target IC 115. A user, working through host 105 may also evaluate the performance of SOC design 165 once implemented within target IC 115.

In another arrangement, a user may select one or more hardware modules that may be implemented in target IC 115 in combination with platform 135. The hardware modules may be specified in lieu of providing HLL application 130 and/or in addition to providing HLL application 130. The hardware modules may be specified as a register transfer level (RTL) description such as one or more hardware description language (HDL) files, a netlist, a programmatic description of a portion of placed and/or routed circuitry, a configuration bitstream, or the like.

Figure 2:
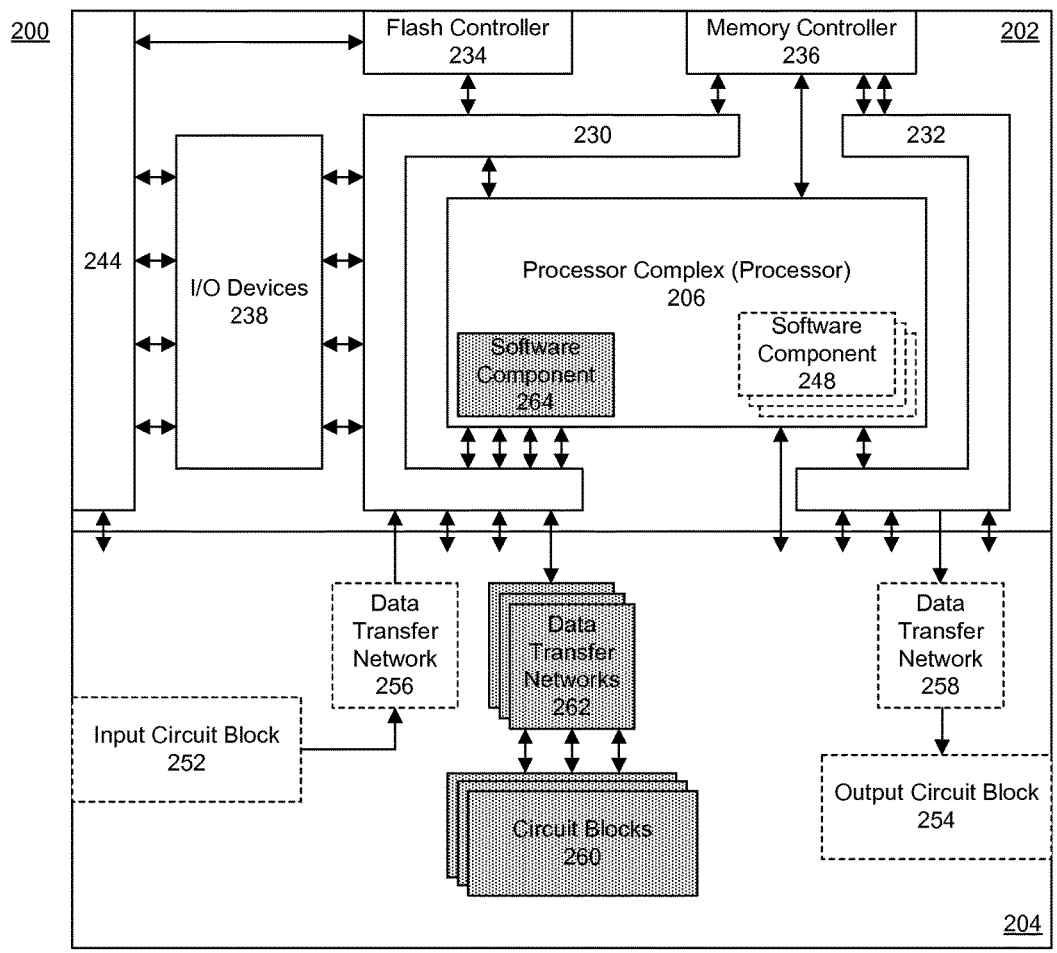
FIG. 2 is a block diagram illustrating an exemplary architecture for an integrated circuit (IC).

FIG. 2 is a block diagram illustrating an exemplary architecture 200 for an IC and an exemplary platform. Architecture 200 is representative of an SOC type of IC. Architecture 200 includes a processor system 202 and programmable circuitry 204. An example of a device that includes a processor system and programmable circuitry may be one or more of the XILINX Zynq® family of SOC type ICs. In one arrangement, architecture 200 may be used to implement target IC 115 of FIG. 1.

Processor system 202 is hardwired. In this regard, the various elements pictured within processor system 202 exist within architecture 200 without first having to load configuration data, i.e., a configuration bitstream. Programmable circuitry 204 is not hardwired. Programmable circuitry 204, as described herein, may include one or more programmable circuit blocks or tiles. The programmable circuit blocks may be configured to form particular circuit structures and/or systems that perform particular operations and/or functions only after configuration data is loaded into configuration memory cells of an IC utilizing architecture 200.

Processor system 202 may include a processor complex 206, also referred to as a processor. Processor 206 may include one or more cores configured to execute program code. Processor 206 may also include one or more other hardwired circuit blocks. For example, processor 206 may include hardwired circuit blocks such as one or more digital signal processing engines, one or more counters, a snoop control unit, on-chip memory, an interrupt controller, a direct memory access (DMA) controller, one or more timers, and a configuration block that may include one or more configuration registers.

Processor 206 may be coupled with other elements within processor system 202 through on-chip interconnects 230 and 232. One example of an interconnect structure that may be used to implement interconnects 230 and/or 232 is the Advanced Microcontroller Bus Architecture (AMBA®) Interconnect available from ARM Limited of Cambridge, United Kingdom. Interconnects 230 and 232 provide on-chip connection and management of functional circuit blocks in an SOC.

Interconnect 230 may couple processor 206 to a flash controller 234, a memory controller 236 supporting any of a variety of available external RAM devices, and one or more I/O devices 238. Interconnect 230 further may provide communication links into programmable circuitry 204 that couple various circuits and/or systems that may be implemented within programmable circuitry 204 to processor 206, flash controller 234, memory controller 236, and/or I/O devices 238. Interconnect 232 couples processor 206 to memory controller 236. Interconnect 232 may also provide communication links into programmable circuitry to couple circuits implemented therein to processor 206 and/or to memory controller 236. Memory controller 236 may also be directly coupled to processor 206. Memory controller 236 provides processor system 202 and programmable circuitry 204 access to an external memory (not shown).

I/O devices 238 may be representative of a plurality of different types of I/O devices, e.g., peripherals, that may be included within processor system 202. Exemplary I/O devices represented by I/O devices 238 may include, but are not limited to, one or more of a Serial Peripheral Interface (SPI) bus, an Inter-Integrated Circuit (I²C) bus, a Controller Area Network (CAN) bus, a Universal Asynchronous Receiver/Transmitter (UART), a General Purpose Input/Output (GPIO), a Secure Digital Input Output (SDIO) with direct memory access (DMA), a Universal Serial Bus (USB) with DMA, a gigabit Ethernet (GigE) with DMA, or the like.

I/O devices 238 may be coupled to an I/O multiplexer 244. I/O multiplexer 244 may receive signals from I/O devices 238, and from flash controller 234, and selectively route the signals to I/O pins and/or into programmable circuitry 204. Similarly, I/O multiplexer 244 may selectively route signals from I/O pins into programmable circuitry 204 and/or into one or more of I/O devices 238 and/or flash controller 234.

As noted, programmable circuitry 204 may include a plurality of programmable circuit blocks or tiles. In one example, programmable circuitry 204 may be implemented as a field programmable gate array (FPGA) on a same die as processor system 202. The programmable circuit blocks may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile may include both programmable interconnect circuitry and programmable logic circuitry. The programmable interconnect circuitry may include a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data may be referred to as a "configuration bitstream." The configuration data can be read from memory (e.g., from an external PROM) or written into architecture 200 by an external device. The collective states of the individual memory cells then determine the function of the programmable circuitry.

A platform such as platform 135 may be designed for implementation within a target IC using architecture 200. The platform may include software components and hardware components. In one aspect, the platform may provide the infrastructure necessary for a user design to interface with systems external to the IC. For example, the platform may provide the circuitry necessary to communicate with a circuit board such as circuit board 110 as described with reference to FIG. 1 and/or other systems coupled to the circuit board.

The hardware components of the platform may include one or more elements of processor system 202 and/or any circuit blocks that may be implemented using programmable circuitry 204. For purposes of illustration, an exemplary platform is depicted within architecture 200 using dashed lines. The exemplary platform may include one or more software components 248 executing in processor 206. The platform may include one or more hardware components including any components of processor system 202 used by the platform. For example, the platform may include memory controller 236, flash controller 234, and/or one or more I/O devices 238. The hardware components may also include any circuit blocks implemented within programmable circuitry 204. In this example, the circuit blocks may include an input circuit block 252, an output circuit block 254, a data transfer network 256, and a data transfer network 258.

Input circuit block 252 may receive data from external sources, e.g., circuit board 110, and write the data to an external memory coupled to memory controller 236. For example, the external memory may also be coupled to circuit board 110. Input circuit block 252 may provide the data to memory controller 236 through data transfer network 256 and through interconnect 230. Output circuit block 254 may read data from the external memory coupled to memory controller 236. Output circuit block 254, for example, may receive data from the external memory via memory controller 236, interconnect 232, and data transfer network 258. Output circuit block 254 may output data to external destinations such as circuit board 110 or other systems coupled to circuit board 110.

In many cases, it is desirable to take an existing design, such as the platform illustrated in FIG. 2, and modify the design in some way. For example, the functionality of the platform may be extended or modified through the implementation of additional circuit blocks in programmable circuitry 204, the addition of new program code that may be executed by processor 206, by modifying existing circuitry, by modifying existing program code, removing circuitry, removing program code, and/or the like.

Referring to the example of FIG. 2, input circuit block 252 and output circuit block 254 may be configured to receive data and output data, respectively. The platform, as illustrated in FIG. 2, for example, may receive video data, store the video data within an external memory, retrieve the video data from the external memory, and output the video data. In this regard, the platform provides basic input and output features. Actual signal processing, however, in terms of motion detection, color correction, and other user desired image processing functions are lacking from the platform. The platform illustrated in FIG. 2 may be provided in conjunction with circuit board 110, for example, by a vendor and used by an end user as a baseline that may be extended to implement additional user-specified functionality.

For purposes of illustration, circuit blocks 260, data transfer networks 262, and one or more software components 264 may be added to the platform. Blocks 260, 262, and/or 264 may be specified by, or derived from, HLL application 130. In another aspect, one or more of blocks 260 may be specified as hardware modules. The hardware modules may be specified in RTL format, as logical network lists (netlists), HDL file(s), hard macros, hardened circuit blocks, configuration bitstreams and/or partial configuration bitstreams, or the like. Blocks 260, 262, and 264 are pictured with shading to illustrate that the blocks are not natively part of architecture 200. Further, blocks 260, 262, and 264 are not originally defined within the platform. Instead, blocks 260, 262, and 264 are added to the platform as an enhancement, e.g., by a user, from HLL application 130. The user may or may not have access to the original design files of the platform.

Circuit blocks 252, 254, 256, 258, 260, and 262 may be implemented as a combination of one or more programmable circuit blocks of programmable circuitry 204. In this regard, the term "circuit block" may be used to refer to circuitry implemented within programmable circuitry by way of loading configuration data into the SOC and/or a hardware element of the processor system.

FIG. 2 illustrates that a user may add hardware and/or software to an existing platform. In this example, a host such as host 105 has added circuit blocks 260 to the existing platform. The host further may automatically couple circuit blocks 260 with the platform using an appropriate data mover. A data mover may include a data transfer network, one of data transfer networks 262, and one or more software components 264. It should be appreciated that while the additions to the platform are shown to communicate with processor 206, in other arrangements, added circuit blocks may communicate directly with one or more other circuit blocks implemented within programmable circuitry 204 (e.g., input circuit block 252 and/or output circuit block 254) and/or with one or more elements of processor system 202.

In one arrangement, the hardware and software components of the platform may be encapsulated so that both the hardware and the software may be extended in functionality purely by analyzing the HLL application provided by a user and the metadata from the platform description. The platform description may describe the operation of the platform and further may specify particular hardware and software resources of architecture 200 that are available as part of the platform for implementing additional features as additional circuit blocks and/or executable program code.

A host may evaluate the platform description, and add, or layer, additional hardware and software onto the existing platform. The host may determine how to couple circuit blocks 260 to the platform through analysis of the connectivity of the HLL representation of circuit blocks 260 and using the metadata describing the platform. The system may then compile and link, e.g., generate, the hardware and software components of the extended, or modified, platform into bootable images that may include object code, firmware, and configuration bitstream(s), whether partial or full. The configuration bitstream(s) may specify data transfer networks 262 and/or circuit blocks 260.

For example, blocks 260 may represent hardware accelerated HLL functions of HLL application 130. Data transfer networks 262 may represent hardware that is automatically generated to couple the hardware accelerated functions with available interfaces of the platform and to processor system 202. Software components 264 may represent portions, which may be modified, of the user's HLL application that may be executed by processor 206.

In another example, as noted, one or more of circuit blocks 260 may be specified in HDL, e.g., as a hardware module. In that case, the host still may analyze connectivity of circuit block 260 and determine how to circuit block 260 to the platform using the connectivity information and the metadata.

The exemplary platform of FIG. 2 is provided for purposes of illustration only. The use of a platform directed to video processing is one exemplary use case and is not intended as a limitation of the inventive arrangements described herein. It should be appreciated that a platform may provide and/or implement any of a variety of different operations and/or functions that may be made available to a user. In general, the platform may provide hardware functions that allow a user to further develop functionality of the platform in a software design environment that relieves the user from having to consider hardware interfaces of the target IC or of the circuit board.

Figure 3:
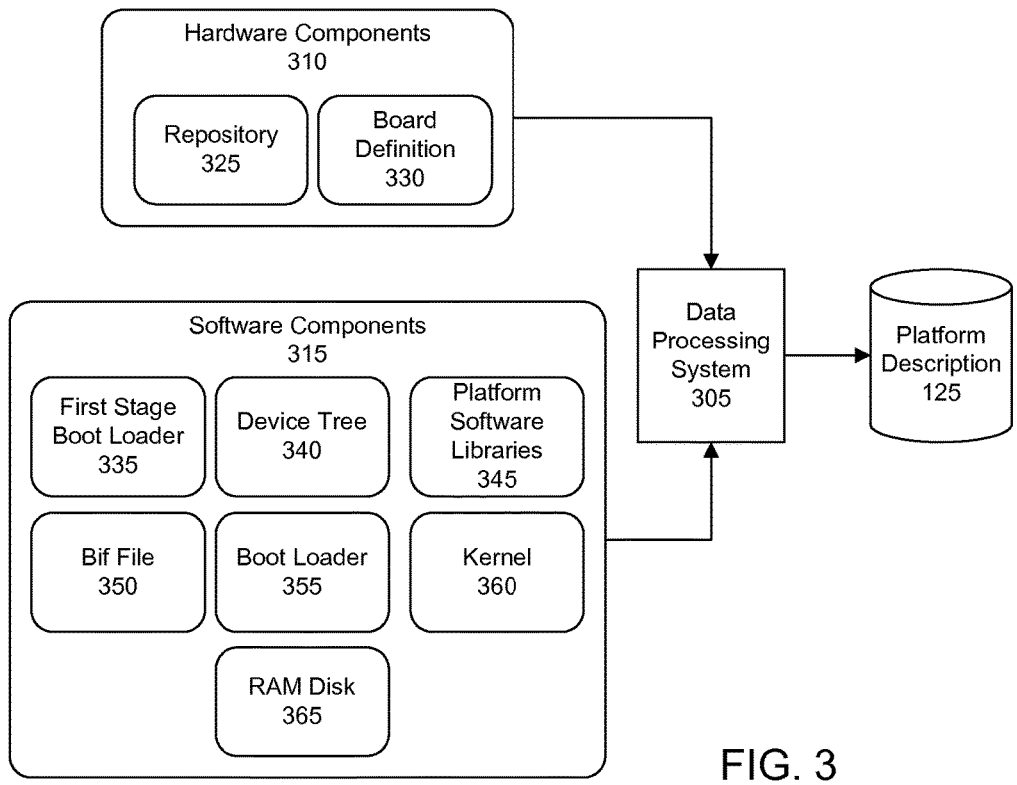
FIG. 3 is a block flow diagram illustrating an exemplary method of creating a platform description.

FIG. 3 is a block flow diagram illustrating an exemplary method of creating platform description 125. Platform description 125 may be provided with platform 135 and corresponding circuit board 110 from a platform provider for use by a user. As pictured, a data processing system (system) 305 may be used to generate platform description 125. System 305 may operate on a plurality of hardware components 310 and a plurality of software components 315 of a circuit design that may be used as platform 135. Using hardware components 310 and software components 315, system 305 may generate platform description 125.

The hardware portion of platform 135 may include processor 206 and/or other hardwired circuitry such as memory controller 236 that provides access to external RAM. The hardware portion of platform 135 may also include one or more other circuit blocks implemented within programmable circuitry of target IC 115 that allow processor 206 to interface with digital-to-analog converters (DACs), analog-to-digital converters (ADCs), other types of input/output blocks (e.g., HDMI, DVI, USB, etc.), execution memory (RAM) through memory controller 236, or the like.

In one aspect, hardware components 310 may include a repository 325. Repository 325 may include one or more hardware modules of platform 135. The hardware modules may include a processor block representing the processor system, e.g., processor system 202, and/or one or more circuit blocks that may be implemented in programmable circuitry of target IC 115 as part of platform 135. System 305 may generate metadata describing particular ones of the hardware modules of repository 325, including available and/or unused interfaces, that are included in platform 135. The metadata may be stored in platform description 125.

Hardware components 310 may also include a board definition 330. Board definition 330 may specify hardware elements of circuit board 110. As noted, target IC 115 may have an architecture as described with reference to FIG. 2.

In general, board definition 330 may be specified as one or more files, e.g., XML files or other markup language files, specifying available peripherals, available ports and/or pins, available settings, presets, and/or the like for circuit board 110. In one aspect, system 305 may generate metadata specifying one or more elements of board definition 330 and store the metadata within platform description 125.

The software portion of platform 135 may include a boot and a runtime environment. Software components 315 may include any combination of one or more of the following: a first stage boot loader (FSBL) 335, a device tree 340, platform software libraries 345, a Bif file 350, a boot loader 355, a kernel 360, and/or a RAM disk 365. FSBL 335, device tree 340, boot loader 355, kernel 360, and RAM disk 365 may be considered operating system, e.g., Linux, boot files.

FSBL 335, when loaded into target IC 115, may control operations such as loading an operating system from non-volatile memory into processor execution memory, loading a stand-alone image of the operating system from non-volatile memory to a second stage boot loader, loading one or more configuration bitstreams and/or partial configuration bitstreams from non-volatile memory into configuration memory of target IC 115 thereby implementing circuit block(s) in programmable circuitry of target IC 115, or the like. FSBL 335 may include one or more different partitions, where each partition may be an executable code image or a configuration bitstream. Both varieties of partition may be included in a same FSBL.

Device tree 340 may be implemented as a data structure stored in memory that describes hardware of target IC 115. Device tree 340 provides hardcoding details of a device or devices (e.g., circuit blocks) of target IC 115 and/or platform 135 for the operating system that is to be executed by processor 140 (or, for example, processor 206) of target IC 115. Device tree 340 may be provided to the operating system at boot time.

Platform software libraries 345 may include one or more program code libraries. Platform software library 345 may be a collection of implementations of behavior, e.g., operations, drivers, etc., written in a programming language having a well-defined interface by which the behavior is invoked. By including platform library 345, the higher level program using platform library 345 need not be written, or re-written to perform the operations of the library. Rather, the operations of the library may be invoked by the higher level program, e.g., HLL application 130.

Boot image file (Bif) file 350 may include one or more different components depending upon the functionality of the platform. Bif file 350 may include an FSBL. Bif file 350 may also include a universal boot loader and/or a configuration bitstream. Boot loader 355 may be a universal boot-loader. Boot loader 355 may be a primary boot loader as is used in embedded devices to package the instructions to boot the operating system kernel of the SOC. Boot loader 355 is typically stored in non-volatile memory and executed to load other data and/or programs from other non-volatile storage into execution memory. Kernel 360 is an image of the operating system to be executed by processor 140 of target IC 115. RAM disk 365 may be a program configured to use a portion of execution memory for processor 140 of target IC 115 (e.g., RAM) as a disk drive.

As noted, system 305, using hardware components 310 and software components 315, may generate platform description 125. Platform description 125 may be implemented as one or more files stored in memory that, when taken collectively, specify metadata for platform 135 describing the various hardware components 310 and software components 315 discussed above for platform 135.

System 305 may generate platform description 125 at the time of export or thereafter. For example, system 305 may generate platform description 125 at compile time of platform 135. System 305 may compile the software environment of platform 135 for processor 140 and perform synthesis, placement, and/or routing on the circuit blocks of repository 325 of platform 135 to generate the completed version of platform 135, e.g., object files and configuration bitstream(s). As part of implementing hardware and software compilation for the platform, system 305 may generate platform description 125 from the original source code files (i.e., HLL source code and/or HDL source code) of the platform.

In some cases, during the design process of platform 135, a designer may flag particular interfaces of hardware modules of platform 135. The interfaces may be flagged using an identifier that, when read by system 305, causes system 305 to include the marked interface in platform description 125. When generating platform description 125, system 305 may include a description of any flagged interfaces within platform description 125. It should be appreciated that since platform 135 is intended to be implemented within a particular target IC, the architecture of that target IC is known by system 305. In this regard, system 305 is aware of which hardware and/or software resources of target IC 115 are used by the platform and which are not.

Figure 4:
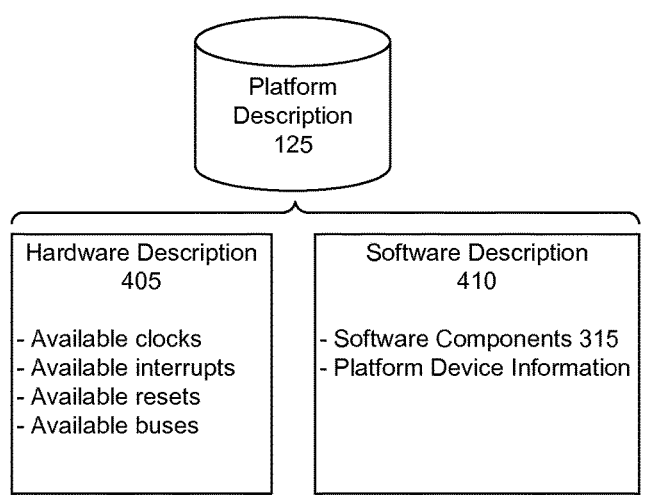
FIG. 4 is a block diagram illustrating an exemplary implementation of a platform description.

FIG. 4 is a block diagram illustrating an exemplary implementation of platform description 125. In the example of FIG. 4, platform description 125 may include a hardware description 405 and a software description 410. In one aspect, each of the descriptions may be specified as an eXtensible Markup Language (XML) file. It should be appreciated, however, that platform description 125 may be specified using any of a variety of different programmatic formats, syntaxes, and/or languages. The particular formats noted herein are provided only for purposes of illustration. Further, platform description 125 may be implemented as a single file or as two or more files.

In general, hardware description 405 may specify available connectivity of the platform. For example, hardware description 405 may specify information about available interfaces of hardware modules of the platform such as available clock sources (e.g., clock ports), available interrupts, available resets, and available buses. The aforementioned interfaces may be used to establish communication between processor 140 and one or more circuit blocks not part of the platform, e.g., hardware accelerators, but that will be added and implemented using programmable circuitry of the target IC from HLL application 130. The various resources specified by hardware description 405 may include resources of target IC 115 that are not being used by platform 135 and, as such, are available for use to implement one or more additional circuit blocks for platform 135 to extend functionality.

In further illustration, hardware description 405 may specify any available bus interfaces of the platform and the particular type of port connections that are available on the bus interfaces. For example, for a given bus interface, hardware description file 405 may indicate the available bus and whether the available port of the bus is an S_AXI_ACP, M_AXI_GP1, or the like.

Hardware description 405 further may specify one or more interface properties such as whether the interface is a streaming interface or a memory mapped interface, data width, whether the interface is coherent, is a connection to the processor (e.g., executable program) memory, and the number of available identifier (ID) bits which limit the number of masters for the port. Another property that may be specified is whether an interrupt connection exists for the port and what the interrupt request (IRQ) is for the port.

Hardware description 405 may also specify one or more data flow properties for the interface. As an example, hardware description 405 may specify whether an interface supports packetized data. In addition, hardware description 405 may include one or more enable properties. Enable properties specify how to enable the interface based upon connectivity that is determined or otherwise inferred by a hardware compiler. When the interface is not used, for example, one or more pins of the interface, when actually implemented within target IC 115, must be properly terminated. In order to use the interface, despite being available as specified in platform description 125, the interface may also need to be enabled. The representation or description of the circuit block of target IC 115 may require configuration to enable the interface that is available. The enable properties indicate how to configure the description of the circuit block to enable the interface for use.

Software description 410 may specify information for the various software components 315 described with reference to FIG. 3. For example, software description 410 may specify file names and/or paths for one or more or all of the various software components described.

In addition, software description 410 may include information specifying a number of devices included in platform 135. Further, software description 410 may specify the number of devices included in platform 135 on a per type basis, where platform 135 includes devices of a plurality of different types. In one example, software description 410 may specify the number of DMA devices included and/or used in platform 135 and/or the number of Linux User IO (UIO) devices included in platform 135. The number of devices of a given type within platform 135 may be needed by host 105 when tasked with adding hardware and/or software to platform 135.

Figure 5:
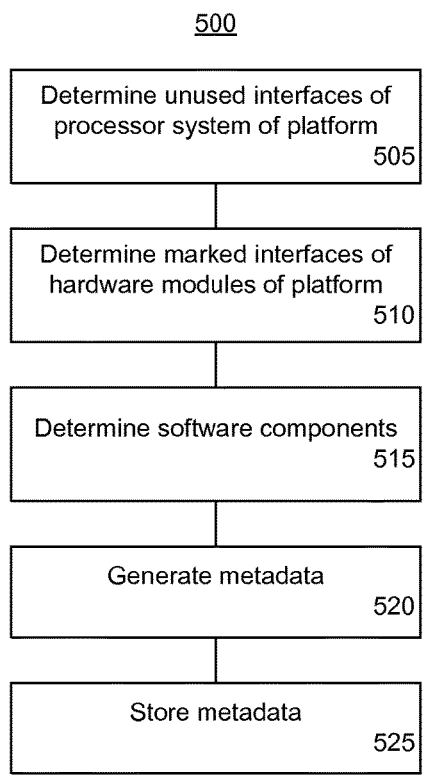
FIG. 5 is a flow chart illustrating an exemplary method of creating a platform description for a platform.

FIG. 5 is a flow chart illustrating an exemplary method 500 of creating a platform description for a platform. Method 500 may be performed by a data processing system (system) as described with reference to FIG. 3. The system may operate on the design files for a platform to generate the platform description. In one arrangement, method 500 may be implemented while processing the platform through a design flow that includes synthesis, placement, and/or routing.

In block 505, the system may determine unused interfaces of the processor system of the platform. In one aspect, the processor system may be represented by a particular hardware module of the circuit design. The system may determine each unused interface including unused interrupts, clock ports, resets, and buses for the processor system from an evaluation of the hardware module for the processor system.

In block 510, the system may determine any marked interfaces of the circuit design for the platform. For other circuit blocks implemented as part of the platform, in order for the interface of those circuit blocks (e.g., hardware modules) to be included in the platform description, the interface must be marked within the design files of the platform. For example, the system may determine whether the source code of the design files, e.g., HDL, HLL, or the like, includes an identifier signifying that the interface is "marked." The system evaluates the interfaces of hardware modules in the platform and determines whether the interface is marked.

In block 515, the system may determine the software components of the platform. In block 520, the system may generate metadata specifying the unused interfaces of the processor system, available interfaces of hardware modules (e.g., marked interfaces), and the software components.

In block 525, the system may store the metadata as a metadata description in a computer-readable storage medium. The metadata may be stored as any of a variety of different data structures such as one or more XML or other markup language files, a database, or the like.

The resulting platform description may specify aspects of the platform software and aspects of the platform hardware. A system, e.g., a host, may add additional hardware and/or software to the platform using the platform description. Such a system does not require access to the design files, e.g., the underlying hardware description files and/or source code files, for the platform in order to add the additional hardware and/or software to the platform. Rather, the system may utilize the user provided hardware accelerators (in HLL and/or hardware module form) in combination with the platform description.

The examples that follow illustrate various portions of metadata that may be generated and stored by a system such as data processing system 305 as part of a platform description. Subsequently, the metadata may be queried by a host to determine how to couple additional software and/or hardware to the platform. In one aspect, portions of the metadata description that are returned as query results may be used as executable program code to implement the hardware accelerators with the platform. For example, one or more results of the querying may be used as instructions for hardware implementation tools, e.g., a host configured for synthesis, placement, and/or routing, to implement the hardware accelerators and couple the hardware accelerators to the platform.

A platform may be implemented to execute an operating system or execute a standalone program. The operating system, for example, may be a version of Linux. In the case of a standalone program, an operating system is not needed or used. For example, a system may create a secure digital (SD) card image that may be used to boot a board including an SOC, as described, to a Linux prompt or to execute the standalone program.

Example 1 is an excerpt of a platform description specifying boot files of the platform that boots into a Linux prompt.

EXAMPLE 1

<xd:bootFiles
    xd:os="linux"
    xd:bif="boot/linux.bif"
    xd:readme="boot/generic.readme"
    xd:devicetree="boot/devicetree.dtb"
    xd:linuxImage="boot/uImage"
    xd:ramdisk="boot/ramdisk.image.gz"/>

Example 2 is an excerpt of a platform description specifying boot files of a platform that executes a standalone program with no operating system.

EXAMPLE 2

<xd:bootFiles
    xd:os="standalone"
    xd:bif="boot/standalone.bif"
    xd:readme="boot/generic.readme"
/>

The delimiter "xd:bif" refers to a Boot image file (Bif). The Bif file may exist in the location specified. An example of a Linux Bif file is shown below as Example 3.

EXAMPLE 3

```
/*linux*/
the_ROM_image:
{
   [bootloader]<boot/fsbl.elf>
   <bitstream>
   <boot/u-boot.elf>
}
```

In one aspect, the system may use the Bif file as a template that describes the boot image contents. The system may replace any text located between the "<" and ">" symbols to create the actual Bif file used to create the boot image. The paths to files generated by the system may replace the tags <bitstream> referring to the generated configuration bitstream, <elf> referring to the generated executable file, and <path/to/file> referring to any path relative to the platform root directory.

In Example 3, the [bootloader] line points to the FSBL, where the path is relative to the current platform root directory. The second line refers to the bitstream generated by the system. The third line refers to the U-boot executable to use.

Example 4 illustrates a standalone Bif file.

EXAMPLE 4

```
/*standalone*/
the_ROM_image:
{
   [bootloader]<boot/fsbl.elf>
   <bitstream>
   <elf>
}
```

In Example 4, the [bootloader] line points to the FSBL. The second line refers to the bitstream generated by the system for the platform. The third line refers to the executable generated by the system for the processor of the target IC. The system may output a README.txt for an SD card image using the template file specified by an xd:readme delimiter. The specified template file may be read and the text between the "<" and ">" symbols of the file replaced by the system to create the final README.txt file included in the SD card image. The system may also replace the tags <elf>, representing the generated executable file, and <platform>, specifying the platform name, in the text above in Example 4.

The platform description may optionally specify libraries, e.g., platform software libraries 345 of FIG. 3. Example 5 illustrates a library portion of a platform description.

EXAMPLE 5

```
<xd:libraryFiles
   xd:os="linux"
   xd:includeDir="arm-xilinx-linux-gnueabi/include"
   xd:libDir="arm-xilinx-linux-gnueabi/lib"/>
<xd:libraryFiles
   xd:os="standalone"
   xd:includeDir="arm-xilinx-eabi/include"
   xd:libDir="arm-xilinx-eabi/lib"/>
```

An exemplary schema for use in Example 5 is illustrated below as Example 6.

EXAMPLE 6

```
<xd:libraryFiles
   xd:os
   xd:includeDir
   xd:libDir
   xd:libName
/>
```

Referring to Example 6, the delimiter xd:os may be used to specify the operating system. Valid values may include "linux" or "standalone". The xd:includeDir delimiter may be used to specify the "include" directory passed to the compiler of the system. The library files may specify only one include directory. The xd:libDir delimiter may be used to specify a library path passed to a linker that may be used by the host to integrate user hardware accelerators with the platform. The library files may specify only one library path. The xd:libName delimiter may be used to specify the library name passed to the linker. The library files may specify only one library name.

In another aspect, the platform description may specify information about device identifiers (IDs) of the platform. The software portion of the platform description may specify a number of devices included in the platform. The number of devices may be specified on a per device type basis, e.g., number of DMAs and/or number of UIOs. The number of devices of a given type, e.g., DMA or UIO, within the platform is needed by the system to generate the necessary data movers to move data from the processor system to the device and for the processor system to obtain data from the device.

In order to include drivers as part of the operating system of the platform, a binding is needed between the device IDs used by the operating system, the devices, and the data movers that are generated. In this example, the devices may be circuit blocks implemented within the programmable circuitry of the target IC. The device IDs used in the software portion of the platform must match the device IDs used for the corresponding data movers that are generated for the various devices.

By specifying the number of devices of the various types and assigning device IDs in a particular sequence, the runtime software and the kernel need not be reconfigured to access any newly specified and/or added devices. For example, the software description may specify a number of devices for each type that the host may use to generate further correct device IDs for each device type of hardware accelerator. The newly specified device IDs may be registered with the kernel and will be consistent with those device IDs already specified for the platform. The devices, e.g., device IDs, may be registered with the kernel by device type. For example, circuit blocks, e.g., devices, of the platform that are UIO devices may be designated as UIO devices within the platform description. Devices that are DMA type devices may be designated as DMA type devices in the platform description.

Referring to the hardware description portion of the platform description, the platform may include one or more bus interfaces. For example, the platform may include one or more AXI interconnects. An AXI interconnect circuit block (AXI interconnect) may be configured to couple one or more AXI memory-mapped master devices, or circuit blocks, to one or more memory-mapped slave devices, or circuit blocks. Another type of AXI interconnect may be configured as a streaming interface. A streaming type of AXI interconnect may be configured to couple an AXI streaming master with an AXI streaming slave. The AXI interconnect circuit blocks may conform to the AM BA® AXI version 4 specifications from ARM® Ltd. of Cambridge, United Kingdom.

The platform may have one or more bus interfaces that are specified within the platform description. The bus interfaces may include a set of "available" and unused ports. For example, the bus interfaces specified within the platform description may specify available and unused AXI interfaces (whether streaming or memory mapped) for communicating with the processor system, a set of unused interrupts for the processor system, unused clock ports, and unused synchronized resets for the processor system.

Example 7 illustrates a parameter for a bus interface that may be included in the hardware description portion of the platform description. In this example, the bus interface is an AXI interconnect.

EXAMPLE 7

```
<xd:parameter
    xd:instanceRef="axi_interconnect_0"
    xd:isValid="'true'"
    xd:name="NUM_SI"
    xd:value="number(count($designComponent/xd:con-
        nection/xd:busInterfa              ce[@xd:
        instanceRef=$instance and starts-with(substring
        ((@xd:name,1,1),'S') and startswith(substring(@xd:
        name,4,4)'_AXI')])+1)"
/>
```

The parameter illustrated in Example 7 is a representation of an instance of an AXI interconnect. The instance is "axi_interconnect_0" having a name of "NUM_SI". The value of the parameter is defined following the "xd:value" delimiter. The value following the "xd:value" delimiter is a system description that the compiler of the system knows about. The system, for example, in reading the value, may determine a count of the number of connections axi_interconnect_0 has for the platform and the number of bus interfaces of the platform needed that are needed or used by the platform itself. The system may determine a count of the number of bus interfaces needed and set a property within the hardware description to the determined number of bus interfaces.

The metadata specified in the hardware portion of the platform description creates a bridge, or mapping, between parameters of circuit blocks such as bus interfaces, and the actual hardware in the platform. The platform description is actionable in that a system, e.g., a compiler of the host, may layer additional hardware and/or software on the platform using the platform description. The system may read the properties from the platform description, which effectively specify properties of the connection graph of the platform. Based upon the properties, the system may set one or more parameters in hardware. The system may set such parameters without using and/or having access to the circuit design itself, e.g., the actual hardware design files or source files.

Example 8 specifies various properties of a bus interface within the hardware description portion of the platform description. When a bus interface is used in the platform, the properties that are specified for the bus interface have many implications relating to how the host establishes connections with that bus interface for newly added hardware and/or software.

EXAMPLE 8

```
<xd:busInterface
    xd:busInterfaceRef="S00_AXI"
    xd:busTypeRef="aximm"
    xd:clockRef="axi_interconnect_0_S00_ACLK"
    xd:resetRef="axi_interconnect_0_S00_ARESETN"
    xd:instanceRef="axi_interconnect_0"
    xd:mode="slave"
    xd:numIds="4"
    xd:coherent="true"
    xd:name="axi_interconnect_0_S00_AXI"
    xd:memport="IC"
/>
```

The bus interface described by Example 8 is referred to as "S00_AXI". The bus type may be specified as streaming or memory mapped. In Example 8, the bus type is specified as memory mapped as indicated by the line xd:busTypeRef="aximm". Bus interface S00_AXI is specified as a slave by the line xd:mode="slave". Bus interface S00_AXI has 4 connections as indicated by the number of IDs specified by the line xd:numIds="4". Further, bus interface S00_AXI is a coherent interface as indicated by the line xd:coherent="true". The coherent port, which is a slave port, may only support a fixed number of masters. Each master requires one bit of the slave port to support the channel for that master and the unique decoding for the master. The metadata of Example 8 specifies how many masters may be added to the port. For example, the port currently has 4 masters requiring 4 bits. In this regard, Example 8 specifies, to the host, the number of connections the bus interface already has within the platform and the current usage of the bus interface within the platform. The host may determine the number of connections available for the interface based upon the total permitted for the port.

In another arrangement, the repository may include a variety of available hardware modules. The hardware modules may be incorporated into a platform or selected by a user for use as hardware accelerators to extend functionality of a platform. The hardware modules within the repository may be specified in any of a variety of different formats. In one example, the repository may be made available to a user as a software callable library that provides compiled applications with access to hardware modules within the platform. The software callable libraries of the repository may include hardware, software, and metadata files. A library provider may encapsulate the required elements of a hardware module into a library that may be used as any other C/C++ static library.

The library may include a header file specifying a function prototype. The function prototype may be specified in the header file as is specified for any C/C++ static library. The header file defines the function interface. The header file is to be included in the source code, e.g., the user's source code or HLL application 130. Example 9 below provides an exemplary header file.

EXAMPLE 9

```
//FILE: fir.h
#define N 256
void fir(signed char X[N], short Y[N]);
```

In Example 9 above, array X is the filter input and Y is the filter output.

The library may also include a static library. The static library may include various elements that allow a software function to be executed and/or implemented in the programmable circuitry of the target IC. The static library may include a function definition, a hardware module, configuration parameters of the hardware module, and a function argument mapping.

The function definition may provide an interface as an entry point into the library. The function definition may provide a set of functions that may be called from user program code (HLL application 130). The contents of the function are not required since the host will replace the function body with API calls that execute data transfer(s) to/from the IP block. The calls are dependent on the data transfer network created by the host. The API calls used require the use of stdlib.h and stdio.h to be included in the file. An exemplary function definition is provided below in Example 10.

EXAMPLE 10

```
//FILE: fir.c
#include "fir.h"
#include <stdlib.h>
#include <stdio.h>
void fir(signed char X[N], short Y[N])
{
//Host replaces function body with API calls for data
   transfer
}
```

The hardware module may be a circuit block specified in HDL that may be used as a backend for the library function or functions. The hardware module may be located in the repository or in any other location. When the library is used, the corresponding hardware module may be instantiated in the hardware system. The hardware module may be customizable at synthesis time. The customization may be performed through parameters that define the behavior of the hardware module. The host may use this information at the time the hardware module is instantiated in a generated system. In one aspect, the parameters may be specified within an XML file as part of the metadata. Example 11 below illustrates exemplary parameters of a hardware module of the library.

EXAMPLE 11

```
<!--FILE: fir.params.xml-->
<?xml version="1.0" encoding="UTF-8"?>
<xd:component    xmlns:xd="http://www.xilinx.com/xi-
    dane"
xd:name="fir_compiler">
<xd:parameter       xd:name="DATA_Has_TLAST"
    xd:value="Packet_Framing"/>
<xd:parameter       xd:name="M_DATA_Has_TREADY"
    xd:value="true"/>
<xd:parameter          xd:name="Coefficient_Width"
    xd:value="8"/>
<xd:parameter xd:name="Data_Width" xd:value="8"/>
<xd:parameter              xd:name="Quantization"
    xd:value="Integer_Coefficients"/>
<xd:parameter      xd:name="Output_Rounding_Mode"
    xd:value="Full_Precision"/>
<xd:parameter              xd:name="CoefficientVector"
    xd:value="6,0,-4,-3,5,6,-6,-13,7,44,64,44,7,-13,-6,
    6,5,-3,-4,0,6"/>
</xd:component>
```

The function argument map may describe the relationship between the C/C++ function and the HDL interface of a hardware module selected for use as a hardware accelerator for the function. The host may use the function argument map to create the program code that performs the data transfers to/from the hardware module and to implement the appropriate connections. The function argument map may be specified in an XML file. The function argument map may specify the information listed below for a hardware accelerator and/or a circuit block of the platform in some cases.

The name of the function mapped onto a component.

A component reference which may be either a name for a C-callable library, or the platform name if the function maps onto any IP within the platform itself.

A C argument name which may be specified as an address expression for a function argument. For example, "x" (pass scalar by value) or "p" (pass by pointer).

A function argument direction which may be specified as either "in" or "out".

A bus interface which may be specified as the name of the hardware module port corresponding to a function argument. For a platform component, the bus interface may be the name of the platform interface "xd:name" as opposed to the actual port name on the corresponding platform.

A port interface type which may specify the corresponding port interface type. For example, the port interface type may be "aximm" (slave only) or "axis".

An address offset which may be specified as a hex address, e.g., "0x40", required for arguments mapping onto "aximm" slave ports.

A data width which may be specified as a number of bits per datum.

An array size which may specify the number of elements in an array argument.

An exemplary function argument map is provided in Example 12 below.

EXAMPLE 12

```
<!--FILE: fir.fcnmap.xml-->
<?xml version="1.0" encoding="UTF-8"?>
<xd:repository       xmlns:xd="http://www.xilinx.com/xi-
    dane">
<xd:fcnMap                         xd:fcnName="fir"
    xd:componentRef="fir_compiler">
<xd:arg xd:name="X"
xd:direction="in"
xd:portInterfaceType="axis"
xd:dataWidth="8"
xd:busInterfaceRef="S_AXIS_DATA"
xd:arraySize="32"/>
<xd:arg xd:name="Y"
xd:direction="out"
xd:portInterfaceType="axis"
xd:dataWidth="16"
xd:busInterfaceRef="M_AXIS_DATA"
xd:arraySize="32"/>
<xd:latencyEstimates xd:worst-case="20"
xd:average-case="20"
xd:best-case="20"/>
<xd:resourceEstimates xd:BRAM="0" xd:DSP="1"
xd:FF="200" xd:LUT="200"/>
</xd:fcnMap>
</xd:repository>
```

Figure 6:
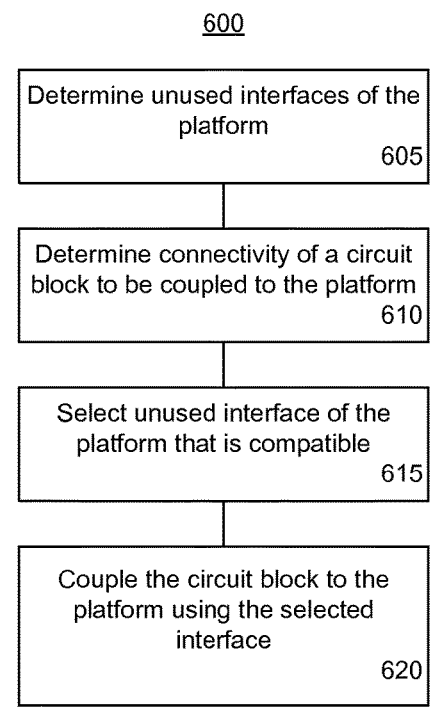
FIG. 6 is a flow chart illustrating an exemplary method of extending a platform.

FIG. 6 is a flow chart illustrating an exemplary method 600 of extending a platform. Method 600 may be performed by a data processing system such as host 105 of FIG. 1. The host may have access to a platform description for a platform that includes both software and hardware components for implementation in a target IC as described herein. A user may wish to extend the functionality of that platform by layering additional hardware and/or software onto the existing platform.

Method 600 may begin in a state where a user has selected or otherwise identified a particular circuit block to the host. The circuit block is selected for layering or adding to the existing platform as circuitry that will be implemented within the programmable circuitry of the target IC in which the platform is implemented. In one arrangement, the circuit block may be a hardware module selected from the repository. In another arrangement, the circuit block may be a function of an HLL application.

In block 605, the host may determine unused interfaces of the platform. Unused interfaces include those interfaces of the target IC that are not used by the platform. The host, for example, may query the platform description to determine the particular interfaces of the platform that are available to couple the selected circuit block to the platform. In one aspect, the host may query the platform description for information about the platform as described herein. The result obtained from the query may be code that is "executable" in that the query result may be a parameter setting or other command used by the host to couple the circuit block to the platform.

In one aspect, as part of determining available interfaces, the host may also determine information such as the type of port connections available for the interface. The host may also determine interface properties such as whether the interface is memory mapped, streaming, the data width, whether the interface is coherent memory mapping, provides a connection to a processor execution memory, the number of identifier bits available, and/or whether the interface provides an interrupt connection and, if so, the IRQ. The host further may determine the type of data that may flow through the interface such as packetized or not, signals of the interface, and the like. The host may also determine the particular enable properties for the interface.

In block 610, the host may determine connectivity information for the selected circuit block. In one aspect, for example, the system may determine the interface used to access the circuit block. For example, whether the circuit block is specified using an HLL or in another programmatic format, the system may determine the inputs and outputs (e.g., arguments), data types of the inputs and outputs, size of the inputs and outputs, the frequency with which data may be exchanged with the processor, and timing requirements for exchanging the data (e.g., loading inputs and sending outputs).

In an example where the circuit block is specified within the repository, the host may evaluate the hardware, software, and metadata files described herein for the selected circuit block. The host may determine the connectivity requirements of the circuit block.

In block 615, the host may select an unused interface of the platform for coupling the circuit block to the platform. The host may select an interface of the platform that is unused, e.g., is available, and that meets the connectivity requirements of the selected circuit block. The host may select an available interface of the platform that meets the connectivity requirements of the selected circuit block in that the properties of the selected interface match the connectivity data, e.g., properties, of the selected circuit block.

For example, the host may determine the required port type of the circuit block, determine whether the circuit block supports coherent operation, determine whether the circuit block requires a memory mapped interface or a streaming interface, determine data widths of inputs and/or outputs of the circuit block, determine whether the circuit block supports packetized data, and the like. The host system may compare the properties of the connectivity data with properties of the available and unused interfaces to select an interface that matches the connectivity data of the block. An interface having properties that match the connectivity data of the block may be said to be compatible with the circuit block.

In block 620, the system may couple the circuit block to the platform using the selected interface. For example, the circuit block may couple to the platform using an available interrupt of the platform, an available bus of the platform, or the like. The circuit block may couple to the interface(s) through a data mover generated by the host.

Figure 7:
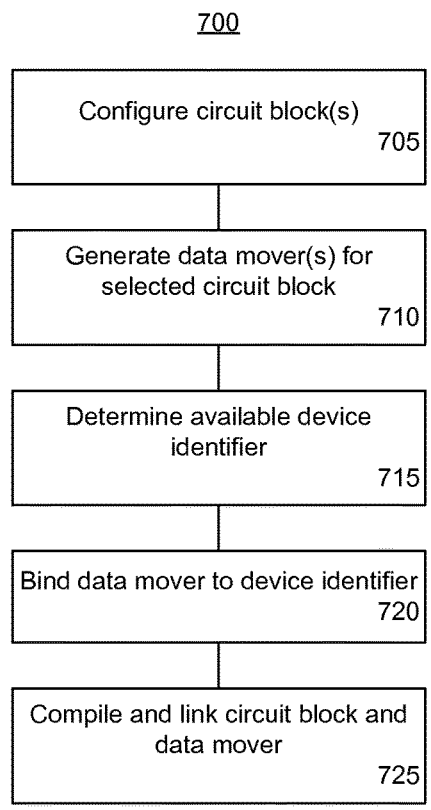
FIG. 7 is a flow chart illustrating an exemplary method of implementing block 620 of FIG. 6.

FIG. 7 is a flow chart illustrating an exemplary method of implementing block 620 of FIG. 6. In block 705, the host may configure one or more circuit blocks. In one aspect, the host may configure one or more platform circuit blocks. For example, in some cases, a circuit block of the platform may have an interface listed as available in the platform description. When the interface is not used, one or more pins of the interface, when actually implemented within the target IC, must be properly terminated. In order to use the interface, despite being available, the interface may also need to be enabled. The host may determine the particular enable properties of the interface from the platform description and enable the interface of the platform circuit block, e.g., reconfigure the hardware module of the platform design that represents the actual circuitry to be enabled. For example, the host may write different values to the hardware module of the platform.

In another aspect, the host may update the circuit block that is to be added or included in the platform. For example, the host may configure the circuit block to couple to a clock source and/or signal of the processor system determined to be unused by the platform. In another aspect, the host may configure, or modify, the circuit block to couple to an interrupt of the processor system determined to be unused by the platform in the case where the circuit block interacts with the processor system using an interrupt.

In block 710, the host system may generate a data mover for the circuit block. A data mover may include a data transfer network that specifies the particular hardware and/or circuitry that is used to exchange data between the processor system and the circuit block, a device driver for the data transfer network, and control program code. The data transfer network may be implemented as a DMA circuit block and/or a first-in-first-out (FIFO) circuit block. The data transfer network may be implemented to couple to the interface selected in block 615 and to the circuit block, thereby coupling the circuit block with the platform.

In one example, a result of querying the metadata description may be used or executed by the host in generating the data transfer network. The data transfer network may be generated as a hardware module using one or more parameters obtained for the available interface from querying the platform description. For example, the host may determine the particular interface, port, interface type, signals, and the like and generate a hardware module, e.g., an HDL module, specifying the data transfer network to couple to the circuit block and the available interface of the platform that is selected.

The data transfer network may couple the hardware accelerator to the available interfaces of the platform such as available clocks, interrupts, and the like. For example, the data transfer network may couple a hardware accelerated function to another hardware accelerated function as a direct connection. In another example, the data transfer network may couple hardware accelerated functions to interconnects 230 and/or 232 and/or to I/O multiplexer 244 thereby coupling the hardware accelerated functions to one or more other components of the processor system such as an available one of I/O devices 238, flash controller 234, and/or memory controller 236 which may be accessible via the interconnects and/or I/O multiplexer.

The control program code may coordinate operation between the processor and the driver created for the data transfer network. The control program code may be generated for execution in the processor to configure the drivers for implementing the necessary data transfers to the circuit block. The particular drivers used may be selected according to the data transfer network that is implemented. For example, a driver for a FIFO circuit block or a driver for a DMA circuit block may be selected. In a further aspect, the control program code may include an interrupt handler associated with the particular interrupt (IRQ) that is coupled to the circuit block.

In illustration, the control program code may configure the driver to ensure that data of a data transfer arrives at the destination at the correct time from a software point of view. The drivers may be kernel level drivers as are used with various operating systems or may be compiled into an executable in environments where no operating system is used. In any case, the device driver ensures that the resources of the data transfer network operate properly.

The control program code is aware of the actual content of data that is being sent and/or received. A device driver is unaware of the actual content of the data being sent and/or received. Because the data transfer network is a switching network, the control program code may add or insert any tags, symbols, or other identifiers into the data that may be required for steering the data through the data transfer network.

In block 715, the host may select an available device identifier of the operating system. The system may query the platform description to determine a next device identifier that is available for use with the circuit block. In block 720, the system may bind the data mover to the device identifier. As such, the device identifier is bound to the selected circuit block, the control program code, the device driver, and the data transfer network.

In block 725, the host may compile and link the circuit block and the data mover. For example, compiling circuit blocks, including the data transfer network of the data mover, may include elaboration, synthesis, placement, routing, and the like. In one example, a result of querying the metadata description may be used or executed by one or more of the elaboration, synthesis, placement, and/or routing tools to implement the circuit block and/or data mover. The query result, which may be a portion of the platform description for an interface, may specify particular implementation parameters to be used by the host in performing one or more of the various phases of the design flow. Compiling the software portions of the circuit design may include generating object code and linking the generated object code into an executable such as the kernel or the application. The resulting, extended platform may be loaded into the target IC thereby implementing the completed SOC design.

In one arrangement, the host may generate a partial configuration bitstream specifying the extension to the platform, e.g., data mover(s) and circuit block(s), with the platform being specified in another configuration bitstream. For example, the configuration bitstream specifying the platform may include a dynamically reconfigurable partition. The hardware accelerators and data transfer network may be specified by a partial bitstream that may be implemented within the dynamically reconfigurable partition. This allows the platform to remain operable while a different partial configuration bitstream specifying different hardware accelerators is implemented in the programmable IC.

In another arrangement, the host system may synthesize, place and/or route the platform circuit blocks to be implemented within the programmable circuitry, the circuit block selected to be added to the platform, and the data mover for the selected circuit block. The host, for example, may generate a configuration bitstream specifying the entirety of the portion of the extended platform to be implemented within the programmable circuitry of the target IC.

Figure 8:
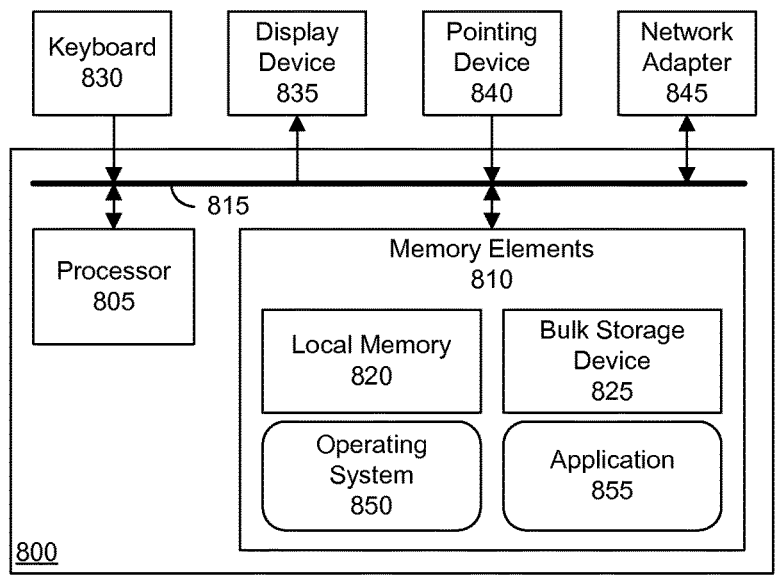
FIG. 8 is a block diagram illustrating an exemplary data processing system.

FIG. 8 is a block diagram illustrating an exemplary architecture 800 for a data processing system. Architecture 800 may be used to implement a system such as host 105 and/or data processing system 305 to perform the various operations described herein. Architecture 800 may include at least one processor, e.g., a central processing unit (CPU), 805 coupled to memory elements 810 through a system bus 815 or other suitable circuitry. Architecture 800 stores program code within memory elements 810. Processor 805 executes the program code accessed from memory elements 810 via system bus 815.

Memory elements 810 include one or more physical memory devices such as, for example, a local memory 820 and one or more bulk storage devices 825. Local memory 820 refers to RAM or other non-persistent memory device(s) generally used during actual execution of the program code. Bulk storage device 825 may be implemented as a hard disk drive (HDD), solid state drive (SSD), or other persistent data storage device. Architecture 800 may also include one or more cache memories (not shown) that provide temporary storage of at least some program code in order to reduce the number of times program code must be retrieved from bulk storage device 825 during execution.

Input/output (I/O) devices such as a keyboard 830, a display device 835, and a pointing device 840 may optionally be coupled to architecture 800. In some cases, one or more of the I/O devices may be combined as in the case where a touchscreen is used as display device 835. In that case, display device 835 may also implement keyboard 830 and pointing device 840.

The I/O devices may be coupled to architecture 800 either directly or through intervening I/O controllers. One or more network adapters 845 may also be coupled to architecture 800 to enable architecture 800 to become coupled to other systems, computer systems, remote printers, and/or remote storage devices through intervening private or public networks. Modems, cable modems, Ethernet cards, and wireless transceivers and/or radios are examples of different types of network adapter 845 that may be used with architecture 800. Depending upon the particular device implemented with architecture 800, the specific type of network adapter, or network adapters as the case may be, will vary.

As pictured in FIG. 8, memory elements 810 may store an operating system 850 and one or more applications 855. Application 855, for example, may be an electronic design automation (EDA) application, an IDE, an HLS, and/or other circuit implementation design tools that may be controlled through the IDE as described herein. In one aspect, operating system 850 and application 855, being implemented in the form of executable program code (e.g., computer readable program instructions), are executed by architecture 800 and, in particular, processor 805. As such, operating system 850 and application 855 may be considered an integrated part of architecture 800. Operating system 850, application 855, and any data items used, generated, and/or operated upon by a system using architecture 800 are functional data structures that impart functionality when utilized by such a system.

In one aspect, architecture 800 may be used to implement a computer or other device that is suitable for storing and/or executing program code. Architecture 800 may be used to implement any of a variety of computer systems and/or devices that include a processor and memory and that are capable of performing the operations described within this disclosure. In some cases, the particular computer system and/or device may include fewer components or more components than described. Exemplary systems may be implemented as a single system having an architecture as shown or as a plurality of networked or interconnected systems each having an architecture the same as, or similar to, that illustrated in FIG. 8.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, or communicatively linked through a communication channel, pathway, network, or system.

As defined herein, the term "automatically" means without user intervention. As defined herein, the term "user" means a human being. The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the terms "if," "when," "upon," mean in response to detecting and/or determining or responsive to detecting and/or determining. For example, the phrase "if [a stated condition or event] is detected," in response to determining and/or detecting [the stated condition or event]." As defined herein, the terms "in response to" and/or "responsive to" mean responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "high level programming language" or "HLL" means a programming language, or set of instructions, used to program a data processing system where the instructions have a strong abstraction from the details of the data processing system, e.g., machine language. For example, a high level programming language may automate or hide aspects of operation of the data processing system such as memory management. The amount of abstraction typically defines how "high level" the programming language is. Using a high level programming language frees the user from dealing with registers, memory addresses, and other low level features of the data processing system upon which the high level programming language will execute. In this regard, a high level programming language includes little or no instructions that translate directly, on a one-to-one basis, into a native opcode of a data processing system. Examples of high level programming languages include, but are not limited to, C, C++, SystemC, OpenCL, or the like.

As defined herein, the term "hardware description language" or "HDL" is a computer-language that facilitates the documentation, design, and implementation of a digital system. The implementation of the digital system may include the transformation of the digital system into a set of masks for IC manufacturing, the programming of a programmable IC such as a field programmable gate array (FPGA), or the like. Using an HDL, for example, a user can design and specify an electronic circuit, describe the operation of the circuit, and create tests to verify operation of the circuit. An HDL includes standard, text-based expressions of the spatial and temporal structure and behavior of the digital system being modeled. HDL syntax and semantics include explicit notations for expressing concurrent operations in a digital system and synchronizing the progress of concurrent operations to achieve a particular combined behavior. In many circuits, this synchronization is based on a globally visible signal called a "clock." It should be appreciated, however, that other mechanisms for synchronization between portions of a circuit may be provided. Thus, in contrast to most high level programming languages, an HDL includes an explicit notion of time, which is a primary attribute of a digital system. An HDL is not equivalent to a high level programming language.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like may represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a computer-readable data storage medium. As defined herein, the phrase "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as RAM, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

In one aspect, the blocks in the flow chart illustrations may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, source code, object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A computer-implemented method may include determining, using the computer, a plurality of unused interfaces of a platform for a target IC and determining, using the computer, connectivity of a circuit block to be coupled to the platform within the target IC. The computer-implemented method may include coupling, using the computer, the circuit block to the platform using an interface that is compatible with the circuit block and selected from the plurality of unused interfaces of the platform.

Determining a plurality of unused interfaces of the platform may include determining an available clock source, wherein the circuit block uses the available clock source, determining an available interrupt, wherein the circuit block uses the available interrupt, and/or determining an available bus, wherein the circuit block couples to the platform using the bus. Determining an available bus may include determining a type of the bus.

Coupling may include generating a data mover for the circuit block, determining a device identifier available within an operating system of the platform, and binding the device identifier to the data mover and the circuit block.

Coupling may also include determining an enable property of the selected interface and enabling the selected interface according to the enable property.

A system may include a processor programmed to initiate executable operations. The executable operations may include determining a plurality of unused interfaces of a platform for a target IC and determining connectivity of a circuit block to be coupled to the platform within the target IC. The circuit block may be coupled to the platform using an interface that is compatible with the circuit block and selected from the plurality of unused interfaces of the platform.

Determining a plurality of unused interfaces of the platform may include determining an available clock source, wherein the circuit block uses the available clock source, determining an available interrupt, wherein the circuit block uses the available interrupt, and/or determining an available bus, wherein the circuit block couples to the platform using the bus. Determining an available bus may include determining a type of the bus.

Coupling may include generating a data mover for the circuit block, determining a device identifier available within an operating system of the platform, and binding the device identifier to the data mover and the circuit block.

Coupling may also include determining an enable property of the selected interface and enabling the selected interface according to the enable property.

A computer-implemented method may include determining, using the computer, available interfaces of hardware modules of the circuit design of the platform, determining, using the computer, a plurality of software components of the circuit design for the platform, and generating, using the computer, metadata specifying the available interfaces and the plurality of software components of the platform. The metadata may be stored in a data structure in a computer-readable storage medium by the computer. The data structure may be queried to add a circuit block to the platform.

Determining available interfaces of hardware modules may include determining an unused interrupt of a processor block, wherein the unused interrupt is listed in the metadata. Determining available interfaces of hardware modules may include determining an unused clock port of a processor block, wherein the unused clock port is listed in the metadata. Determining available interfaces of hardware modules may include determining an unused bus for a processor block, wherein the unused bus is listed in the metadata.

Determining a plurality of software components of the circuit design for the platform may include determining a number of devices and corresponding device identifiers registered with a kernel of the platform. The number of devices and corresponding device identifiers registered with the kernel are listed in the metadata.

The computer-implemented method may also include querying the data structure to determine an available interface of a hardware module of the platform and coupling a circuit block to the available interface of the hardware module of the platform.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A computer-implemented method of reusing a platform, comprising:
    determining, using the computer, a plurality of unused interfaces of a platform for a target integrated circuit by querying metadata for the platform, wherein the platform comprises a circuit design and software configured for implementation within the target integrated circuit and the metadata specifies interfaces of the target integrated circuit used by the platform and unused interfaces of the target integrated circuit available for the platform;
    determining, using the computer, connectivity of a circuit block to be added to the circuit design and the software of the platform within the target integrated circuit; and
    coupling, using the computer, the circuit block to the platform using an interface that is compatible with the connectivity of the circuit block and selected from the plurality of unused interfaces of the platform.

2. The method of claim 1, wherein determining a plurality of unused interfaces of the platform comprises:
    determining an available clock port, wherein the circuit block uses the available clock port.

3. The method of claim 1, wherein determining a plurality of unused interfaces of the platform comprises:
    determining an available interrupt, wherein the circuit block uses the available interrupt.

4. The method of claim 1, wherein determining a plurality of unused interfaces of a platform comprises:
    determining an available bus, wherein the circuit block couples to the platform using the bus.

5. The method of claim 1, wherein determining an available bus, further comprises:
    determining a type of the bus.

6. The method of claim 1, wherein coupling further comprises:
    generating a data mover for the circuit block;
    determining a device identifier available within an operating system of the platform; and
    binding the device identifier to the data mover and the circuit block.

7. The method of claim 1, wherein coupling further comprises:
    determining an enable property of the selected interface; and
    enabling the selected interface according to the enable property.

8. A system, comprising:
    a processor programmed to initiate executable operations comprising:
    determining a plurality of unused interfaces of a platform for a target integrated circuit by querying metadata for the platform, wherein the platform comprises a circuit design and software configured for implementation within the target integrated circuit and the metadata specifies interfaces of the target integrated circuit used by the platform and unused interfaces of the target integrated circuit available for the platform;
    determining connectivity of a circuit block to be added to the circuit design and the software of the platform within the target integrated circuit; and
    coupling the circuit block to the platform using an interface that is compatible with the connectivity of the circuit block and selected from the plurality of unused interfaces of the platform.

9. The system of claim 8, wherein determining a plurality of unused interfaces of the platform comprises:
    determining an available clock port, wherein the circuit block uses the available clock port.

10. The system of claim 8, wherein determining a plurality of unused interfaces of the platform comprises:
    determining an available interrupt, wherein the circuit block uses the available interrupt.

11. The system of claim 8, wherein determining a plurality of unused interfaces of the platform comprises:
    determining an available bus, wherein the circuit block couples to the platform using the bus.

12. The system of claim 11, wherein determining an available bus, further comprises:
    determining a type of the bus.

13. The system of claim 8, wherein coupling further comprises:
    generating a data mover for the circuit block;
    determining a device identifier available within an operating system of the platform; and
    binding the device identifier to the data mover and the circuit block.

14. The system of claim 8, wherein coupling further comprises:
    determining an enable property of the selected interface; and
    enabling the selected interface according to the enable property.

15. A computer-implemented method, comprising:
    determining, using the computer, available interfaces of hardware modules of the circuit design of the platform;
    determining, using the processor, a plurality of software components of the circuit design for the platform;
    generating, using the processor, metadata specifying the available interfaces and the plurality of software components of the platform; and
    storing, using the processor, the metadata within a data structure in a computer-readable storage medium.

16. The method of claim 15, wherein determining available interfaces of hardware modules comprises:
    determining an unused interrupt of a processor block;
    wherein the unused interrupt is listed in the metadata.

17. The method of claim 15, wherein determining available interfaces of hardware modules comprises:
    determining an unused clock port of a processor block;
    wherein the unused clock port is listed in the metadata.

18. The method of claim 15, wherein determining available interfaces of hardware modules comprises:
    determining an unused bus for a processor block;
    wherein the unused bus is listed in the metadata.

19. The method of claim 15, wherein determining a plurality of software components of the circuit design for the platform comprises:
    determining a number of devices and corresponding device identifiers registered with a kernel of the platform;

wherein the number of devices and corresponding device identifiers registered with the kernel are listed in the metadata.

20. The method of claim 15, further comprising:

querying the data structure to determine an available interface of a hardware module of the platform; and coupling a circuit block to the available interface of the hardware module of the platform.

* * * * *